(No Model.) 2 Sheets—Sheet 1.
C. A. & W. H. CHAPMAN.
ELASTIC TIRE AND RIM FOR VEHICLE WHEELS.
No. 600,572. Patented Mar. 15, 1898.
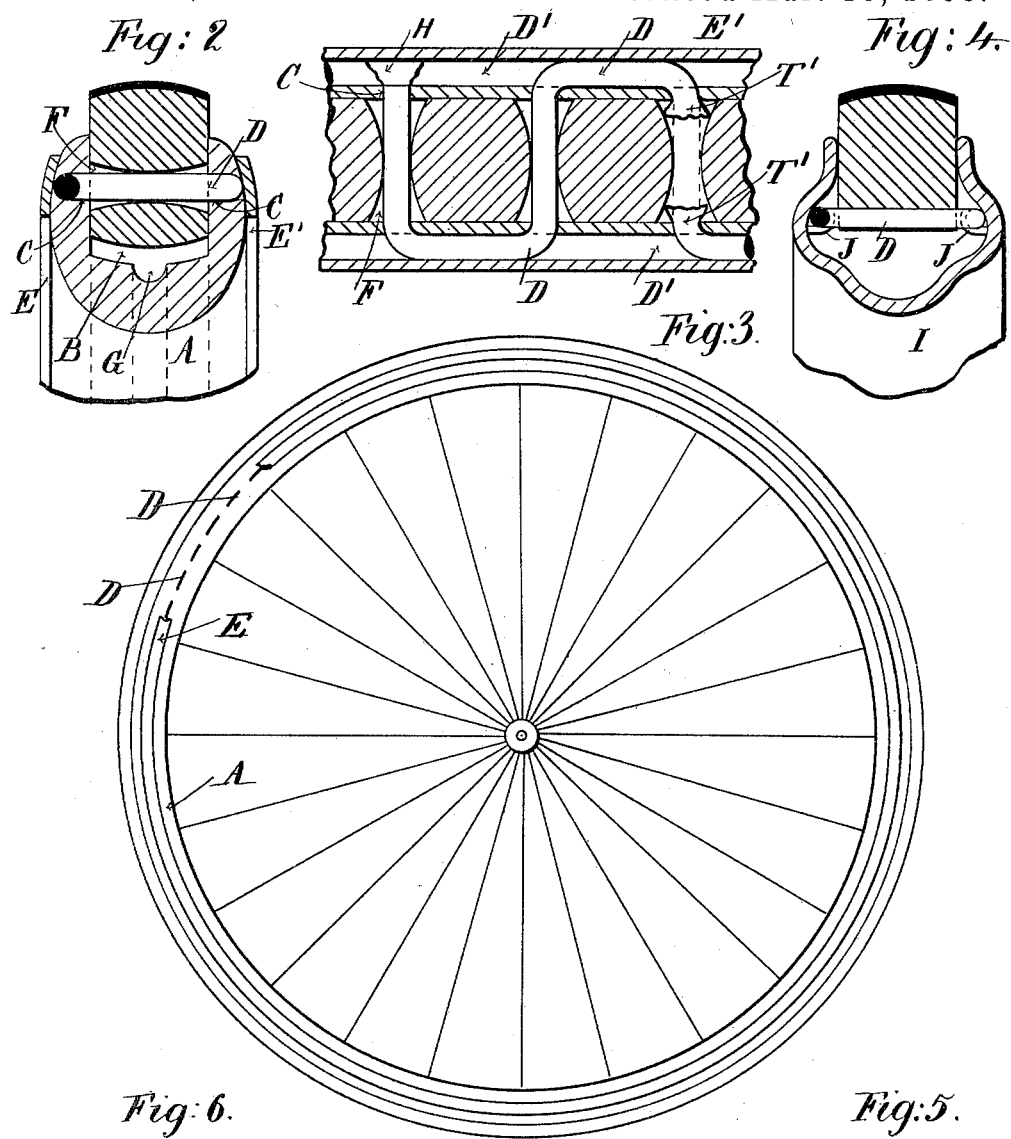
Witnesses
E. Vernon Ellis
James D. Stevens
Inventors.
Charles Arthur Chapman
William Henry Chapman
by Foster Freeman
Attorneys
THE NORRIS PETERS CO., PHOTO-LITHO., WASHINGTON, D. C.

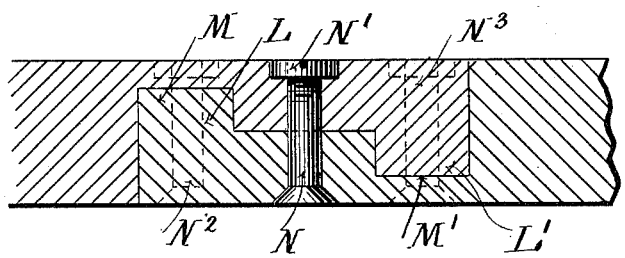
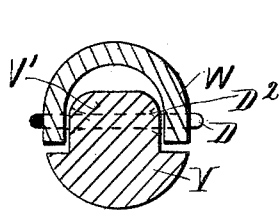
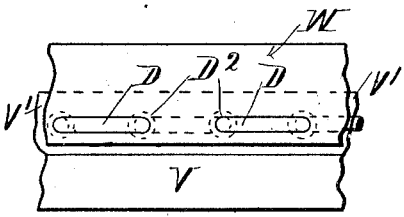
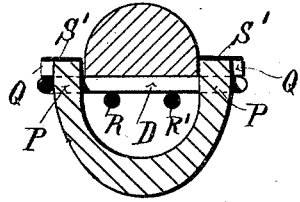
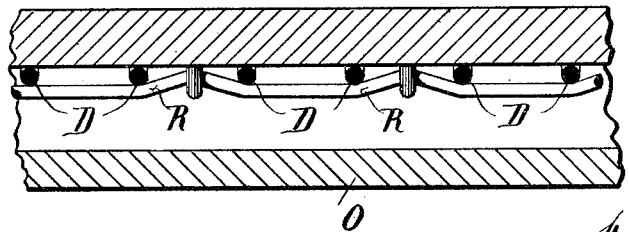

UNITED STATES PATENT OFFICE.

CHARLES ARTHUR CHAPMAN AND WILLIAM HENRY CHAPMAN, OF LONDON, ENGLAND.

ELASTIC TIRE AND RIM FOR VEHICLE-WHEELS.

SPECIFICATION forming part of Letters Patent No. 600,572, dated March 15, 1898.

Application filed April 6, 1897. Serial No. 631,012. (No model.) Patented in England March 24, 1897, No. 7,627.

*To all whom it may concern:*

Be it known that we, CHARLES ARTHUR CHAPMAN, residing at Glenthorne, Horley, and WILLIAM HENRY CHAPMAN, residing at 18 East Dulwich Road, East Dulwich, London, in the county of Surrey, England, subjects of the Queen of Great Britain and Ireland, have invented certain new and useful Improvements in Elastic Tires and Rims for the Wheels of Velocipedes and other Vehicles, (for which we have obtained a patent in Great Britain, No. 7,627, bearing date March 24, 1897,) of which the following is a specification.

This invention relates to improvements in elastic tires and rims for the wheels of velocipedes and other vehicles, and has for its object to produce a tire and rim for the same. The said tire, while being composed of any non-resilient substance or combination of non-resilient and resilient substances, shall possess all the elements of elasticity to be obtained by the use of a pneumatic or like tire.

According to this invention we employ a wheel having a rim of such section as will allow of a cord of rubber, which may be continuous or in lengths, being stretched across the channel or trough formed therein, upon which is mounted or suspended the tire proper, or the wheel may have an approximately T-shaped section, the cord above mentioned passing through the center or vertical part of the said rim and also through the tire, holes being formed at suitable intervals to allow of this, or where the tire rests upon the rubber a number of projections may be formed upon the inner periphery of the said tire to engage with the rubber above mentioned; and in order that this invention may be the better understood we will proceed to describe the same with reference to the appended two sheets of drawings, in which—

Figure 1 is a side elevational view of a wheel with a tire constructed according to this invention. Fig. 2 is a transverse section of the rim and tire, showing the arrangement of the spring. Fig. 3 is a sectional plan also showing the arrangement of springs and the tire. Fig. 4 is a transverse section of another form of rim and tire. Fig. 5 is a sectional plan of Fig. 4. Fig. 6 is a longitudinal section showing more clearly the construction of the tire and arrangement of springs. Fig. 7, Sheet 2, shows a method of securing the segments composing the tire one to another. Fig. 8 is a transverse section of another form of rim and tire. Fig. 9 is a longitudinal section of Fig. 8. Figs. 10 and 11 are respectively a cross-section and side elevation illustrating an alternative method of construction.

Referring to Figs. 1, 2, and 3, A is the rim of the wheel, which may be of wood and has a channel or trough B formed in the outer circumference thereof. The walls of the channel are perforated at suitable intervals, as indicated at C, and have threaded therethrough a rubber cord D. A recess or groove D' is formed upon the outside of the rim on both sides to receive the cord D, to protect which from injury metal rings E E' are provided and may be secured to the rim by means of screws or the like.

Within the channel B is placed the annular ring forming the tire, which may be of wood or metal or a combination of wood and metal, wood and rubber, or metal and rubber, or any other suitable material, as may be found most suitable, and the tread of the tire may be of any desired outline, and the ring aforesaid may be built up of two or any number of segments.

At distances corresponding to those in the rim are drilled or otherwise formed in the ring a number of holes F, through which is threaded the cord D, the ring thus being, as it were, suspended within the channel B. To allow of the free vertical movement of the tire, the holes F aforesaid are enlarged at the sides of the tire, as shown, the object being to prevent the cord jamming between the tire and the walls of the channel.

It will be seen from the drawings that the channel is of a somewhat greater depth than the inclosed portion of the tire to allow the same to move vertically when the weight is placed upon the wheel. A groove G is formed at the bottom of the trough to receive the heads or nipples for the spokes. The ends of the cord are secured as shown at H, Fig. 3, from which it will be seen that the rubber when cut or broken will resume its normal thickness, thereby forming a natural head or stop and leaving adjoining portions of the cord unaffected and intact and preventing the cord from being withdrawn, as shown enlarged at T', Fig. 3. It is obvious that the same action will take place in the event of the cord breaking, and thus prevent any loosening or collapse of the tire.

In Fig. 4 is shown a section of a rim I having instead of holes a series of internal hooks J at suitable intervals. These hooks may be formed in any suitable manner, such as by stamping, or they may be afterward inserted in the rim. The cord D in this case is passed over the hooks, as shown in Fig. 5, and the tire is provided upon its inner periphery with a series of projections K, Fig. 6, which engage with the cord and prevent the tire "creeping" or otherwise becoming displaced, or the projections may have circular grooves at the ends to engage with the cord D.

In Fig. 7, Sheet 2, is shown a method of securing the ends of the segments forming the tire one to another, the two portions L L' engaging with corresponding recesses M M', a bolt and nut N N' securing the whole together, and recesses formed for the nut and bolt-head, or instead of one bolt two may be used and would be placed as shown by the dotted lines at $N^2$ and $N^3$, Fig. 7.

Referring to Figs. 8 and 9, the tire in this case is supported upon the cord D, as shown. The rim O has slots P cut therein (indicated by dotted lines) and a projection Q formed upon the outside of the rim on both sides, the cord coming in contact with the projections, which thereby retain the same in position. To limit the movement of the tire, the cord D is retained by means of the two rubber bands R R' running round the tire upon the inner periphery and secured at intervals, as shown. Metal rings S' S' are provided and serve to keep the rubber cord in the slots P.

In the case of the rim shown in Figs. 2 and 4 one side of the rim may be movable. The tire in this case would be solid and slipped onto the rubber. The tire shown in Figs. 4, 5, and 6 and having projections would be used.

In Figs. 10 and 11 is shown a rim V and tire for the same in which in place of the channel hitherto described a projection V' is formed, having holes drilled or otherwise formed therein, through which is passed the cord D. The holes are enlarged at their outer ends, as shown in dotted lines at $D^2$, to allow of the free vertical movement of the tire W, which in this case is in the form of an inverted U, having holes corresponding to those within the rim.

With a tire and rim as described it is possible to construct the tire in one piece, and the projection V' having been inserted within the tire sufficient play would be allowed to slip the whole tire over the rim, the lacing of the rubber being afterward effected.

Having now particularly described and ascertained the nature of our said invention and in what manner the same is to be performed, we declare that what we claim is—

1. The combination with a channeled rim, of a tire the base of which is inclosed within the channel of the rim, and a yielding cord extending from one side of the channel to the other and supporting the tire out of contact with the bottom of the channel, said cord being unexposed upon the exterior of the rim, substantially as described.

2. The combination with a rim having a peripheral channel and annular grooves in its side communicating with the channel through eyes, of a tire within the rim, an elastic cord within the grooves of the rim extending through the eyes and across the channel thereof and constituting a support for the tire, and plates secured to the sides of the rim and closing the grooves thereof, substantially as described.

3. The combination with a channeled rim provided in its sides intermediate the height thereof with eyes, of a tire within the rim provided near its base with transverse openings having flaring ends, and an elastic cord under longitudinal tension threaded through the eyes of the rim and openings of the tire for maintaining the tire out of contact with the bottom of the channel, substantially as described.

In testimony whereof we have signed our names to this specification in the presence of two subscribing witnesses.

CHARLES ARTHUR CHAPMAN.
WILLIAM HENRY CHAPMAN.

Witnesses:
EDWARD GEORGE CHAPMAN,
CHARLES RICHARD CHAPMAN.